(12) United States Patent
Marcos Izquierdo

(10) Patent No.: US 12,140,220 B2
(45) Date of Patent: Nov. 12, 2024

(54) LUBRICATING OIL DEFLECTOR, SPEED REDUCTION GEAR INCLUDING SUCH A DEFLECTOR AND TURBOMACHINE INCLUDING SUCH A SPEED REDUCTION GEAR

(71) Applicant: SAFRAN TRANSMISSION SYSTEMS, Colombes (FR)

(72) Inventor: Juan-Luis Marcos Izquierdo, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/183,688

(22) Filed: Mar. 14, 2023

(65) Prior Publication Data

US 2023/0296168 A1    Sep. 21, 2023

(30) Foreign Application Priority Data

Mar. 16, 2022    (FR) ........................................ 2202313

(51) Int. Cl.
*F16H 57/08*    (2006.01)
*F01D 15/12*    (2006.01)
(Continued)

(52) U.S. Cl.
CPC ......... *F16H 57/0427* (2013.01); *F01D 15/12* (2013.01); *F01D 25/18* (2013.01);
(Continued)

(58) Field of Classification Search
CPC ............. F16H 57/0427; F16H 57/0482; F16H 57/0486
See application file for complete search history.

(56) References Cited

U.S. PATENT DOCUMENTS 9,038,779 B2 * 5/2015 McCune ............. F16H 57/0423
    184/6.11
9,476,321 B2 * 10/2016 Haugh ...................... F02C 7/14
(Continued)

FOREIGN PATENT DOCUMENTS

EP    3767134    1/2021
FR    3103529 A1    5/2021
(Continued)

OTHER PUBLICATIONS

French Search Report issued in French Application No. 2202313, mailed on Oct. 4, 2022 (9 pages).

*Primary Examiner* — Derek D Knight
(74) *Attorney, Agent, or Firm* — BookoffMcAndrews, PLLC

(57) ABSTRACT

The invention relates to a lubricating oil deflector for a speed reduction gear of a turbomachine, the deflector comprising a body having a first end intended to be disposed facing a sun gear of the reduction gear, the first end being configured to receive oil from the sun gear and an opposite second end configured to discharge the oil from the body, the body including two side faces each intended to be disposed facing a planet gear of the reduction gear and each connecting the first and second ends together, the body including at least one inner oil guide channel that opens out at the first end and at the second end and is configured to discharge the oil by gravity through the second end.

13 Claims, 8 Drawing Sheets

(51) Int. Cl.
*F01D 25/18* (2006.01)
*F16H 1/28* (2006.01)
*F16H 57/04* (2010.01)

(52) U.S. Cl.
CPC ............ *F16H 1/28* (2013.01); *F16H 57/045* (2013.01); *F16H 57/0486* (2013.01); *F05D 2260/40311* (2013.01)

(56) References Cited

U.S. PATENT DOCUMENTS

| | | | |
|---|---|---|---|
| 10,202,902 B2 * | 2/2019 | McCune | F16H 57/0423 |
| 10,859,155 B2 * | 12/2020 | Clark | F01D 25/18 |
| 11,597,015 B2 * | 3/2023 | Clark | B23P 15/00 |

FOREIGN PATENT DOCUMENTS

| | | |
|---|---|---|
| WO | 2014046926 A1 | 3/2014 |
| WO | 2019141920 A1 | 7/2019 |

\* cited by examiner

[Fig. 1]
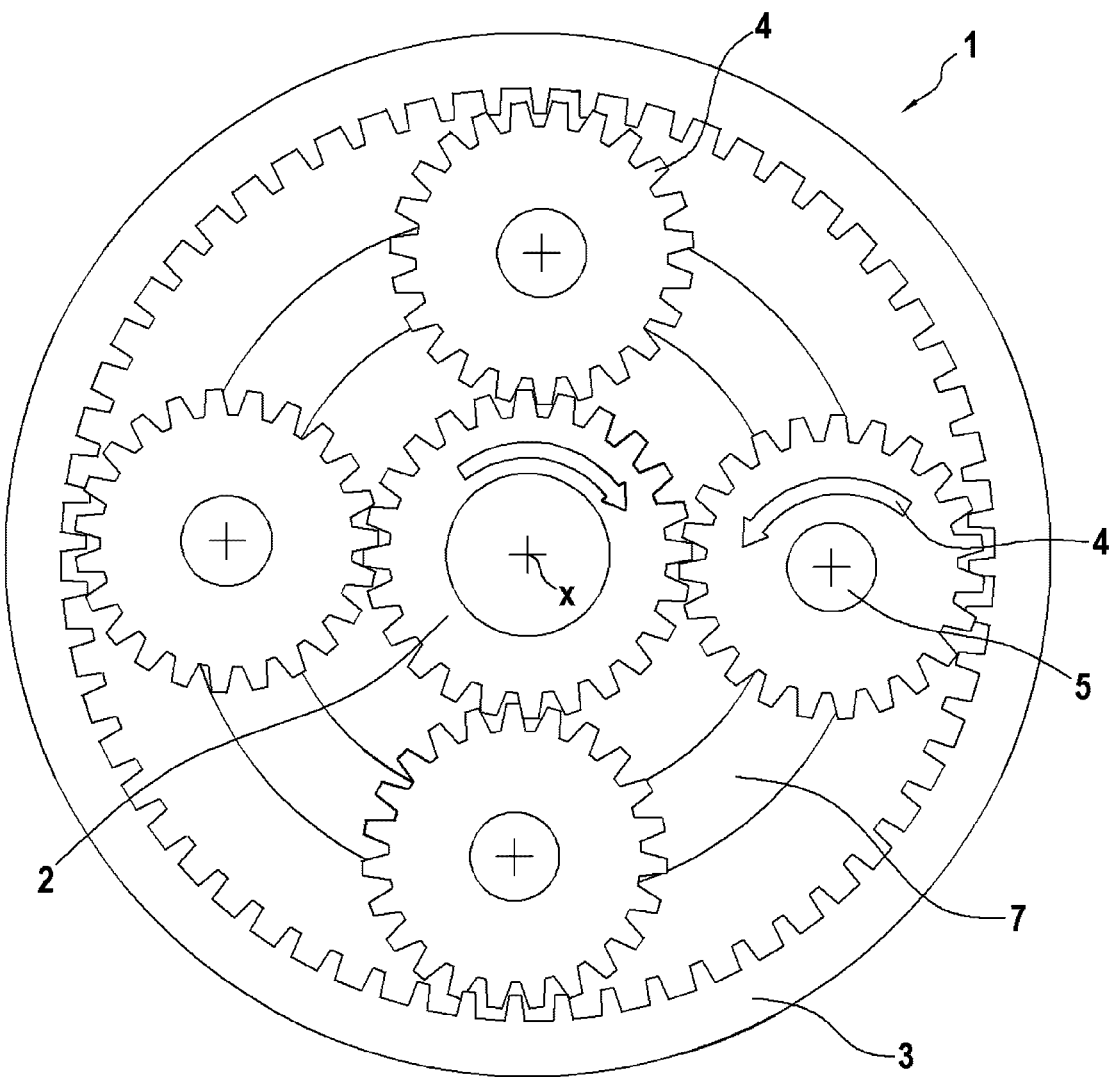
Prior Art

[Fig. 2]
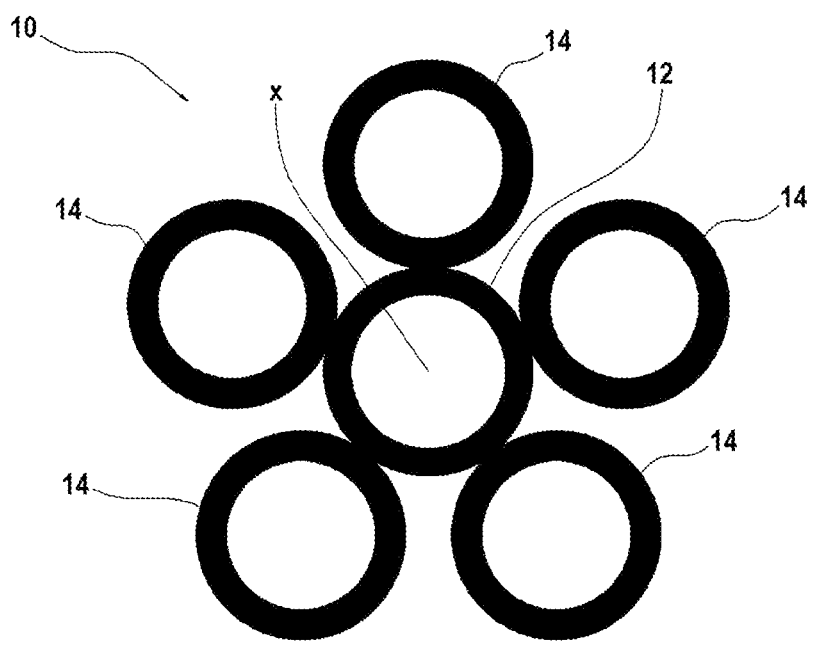

[Fig. 3]
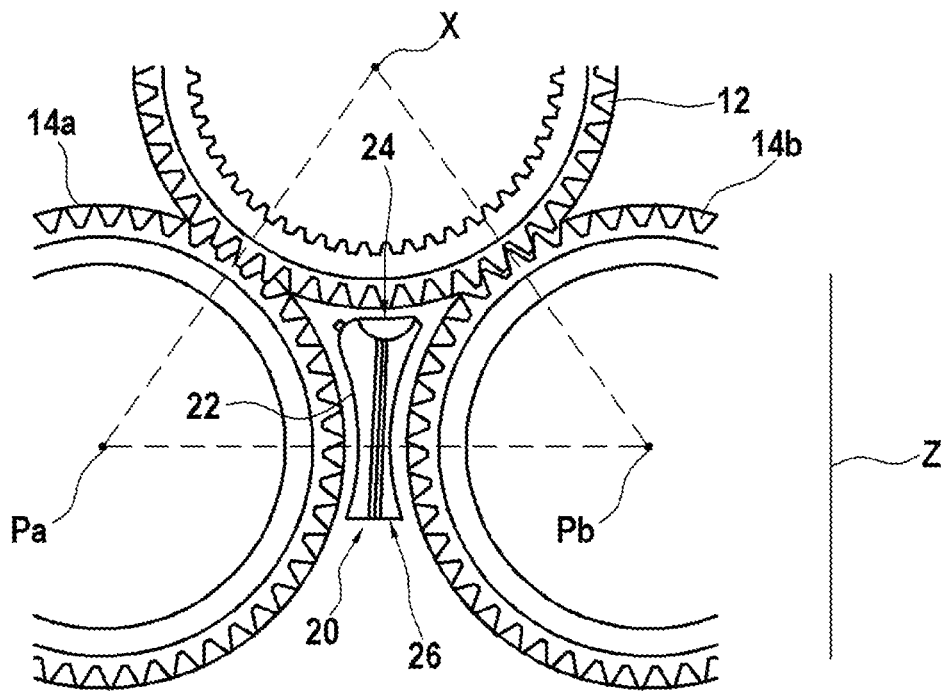
[Fig. 4]
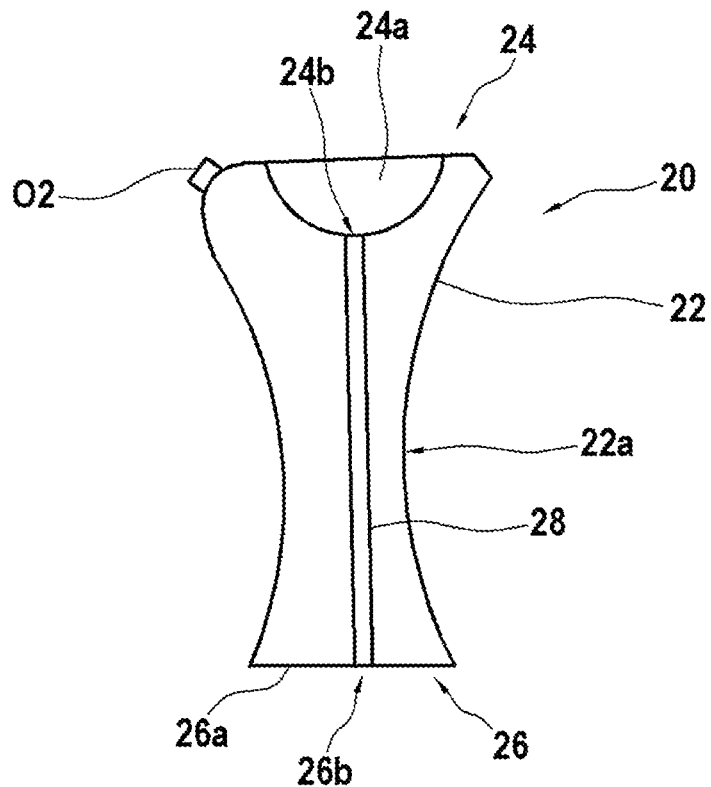

[Fig. 5]
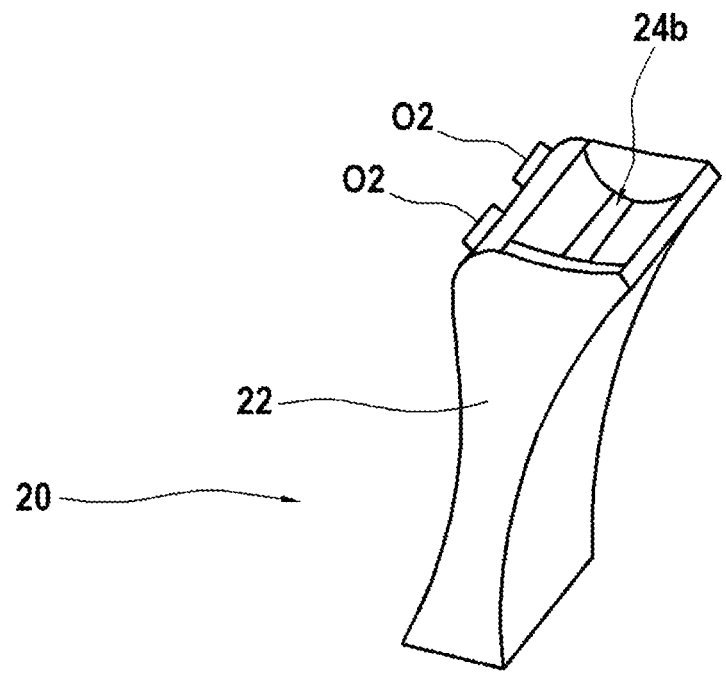
[Fig. 6A]
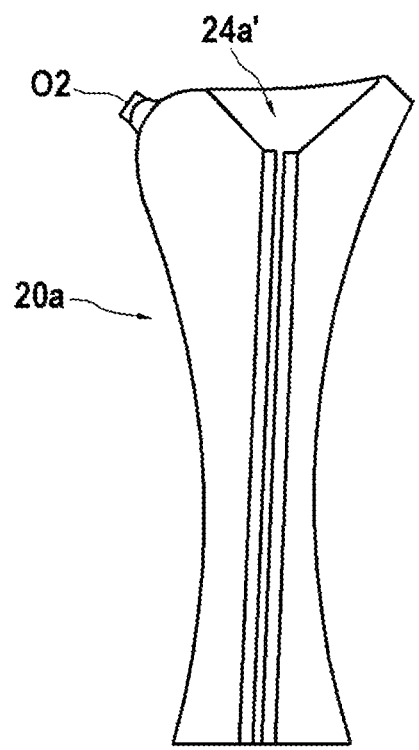

[Fig. 6B]
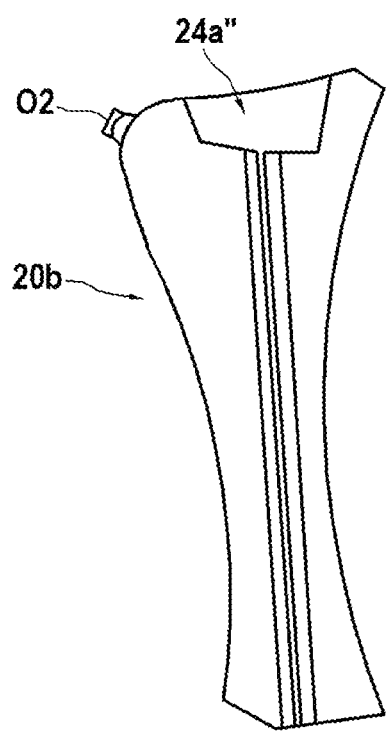

[Fig. 7]
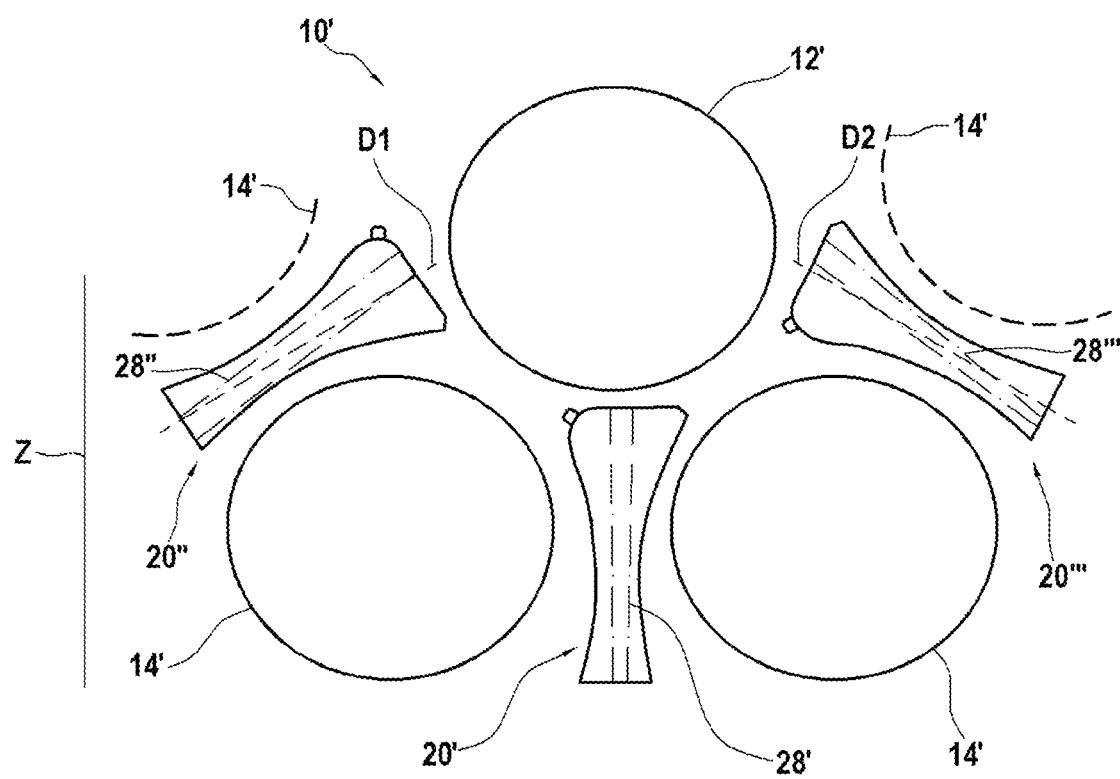

[Fig. 8]
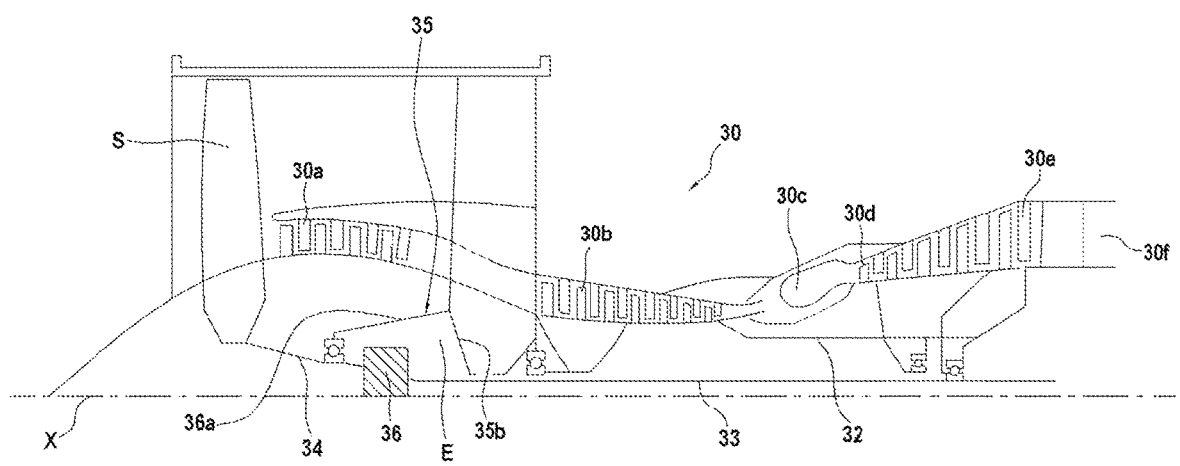

[Fig. 9]
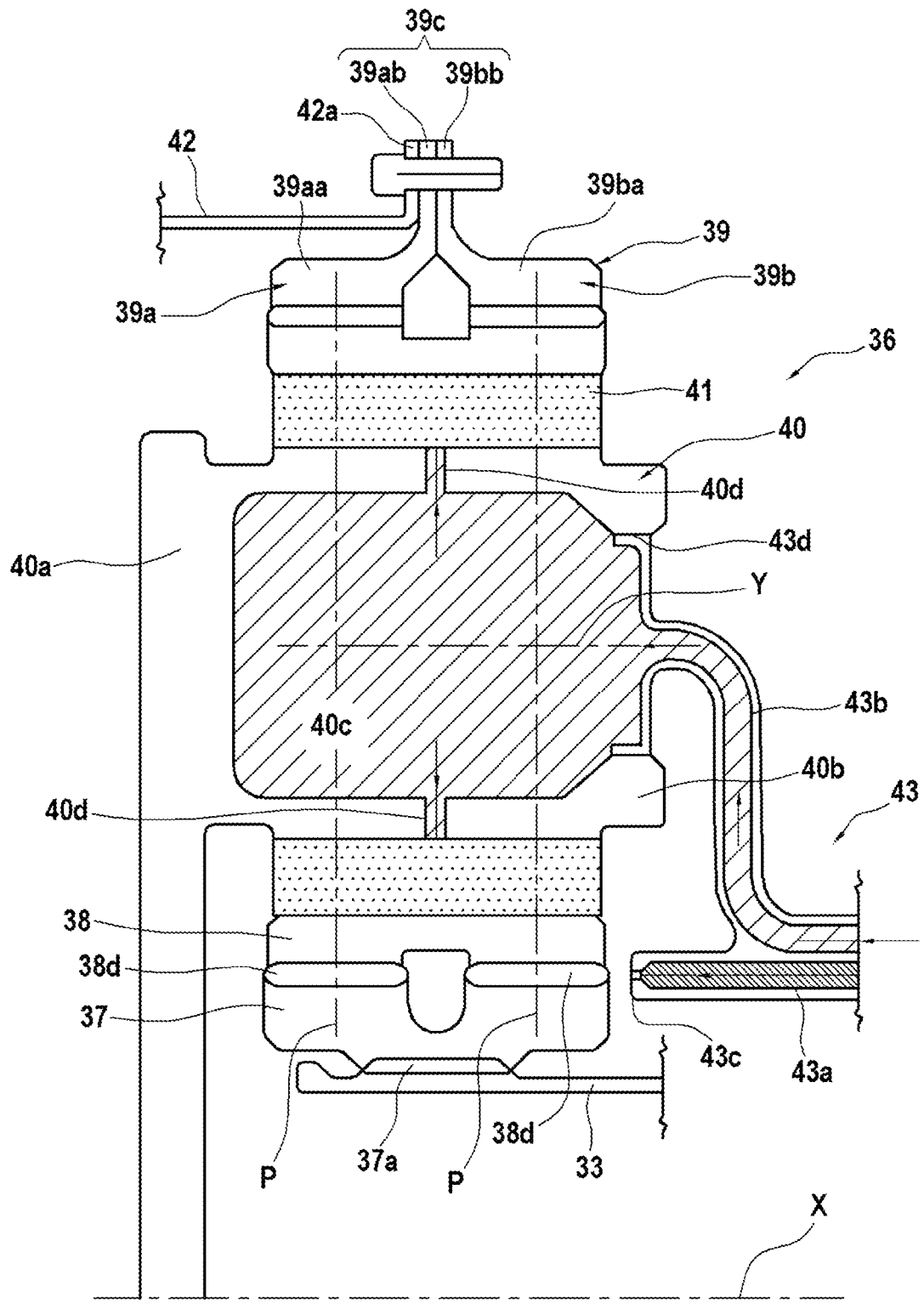

LUBRICATING OIL DEFLECTOR, SPEED REDUCTION GEAR INCLUDING SUCH A DEFLECTOR AND TURBOMACHINE INCLUDING SUCH A SPEED REDUCTION GEAR

TECHNICAL FIELD

The present disclosure relates to a lubricating oil deflector, a speed reduction gear including such a deflector, as well as an aircraft turbojet engine with a fan including such a speed reduction gear.

PRIOR ART

Current fan aircraft turbomachines with a high bypass ratio include a mechanical transmission system, called reduction gear, whose function is to drive in rotation the fan shaft from the rotation of a power turbine of the low-pressure line of the turbojet engine. The reduction gear thus allows transforming the speed of rotation of the shaft of the power turbine into a reduced speed of rotation for the shaft driving the fan. In general, the reduction gear must transmit the engine power to the fan while ensuring the required speed ratio and this, within very severe space requirement and mass constraints. Several architectures and technologies are possible for the reduction gear and the architecture chosen depends primarily on the speed reduction ratio.

FIG. 1 represents a cross-sectional view of a speed reduction gear according to the prior art. This figure illustrates an architecture in which the speed reduction gear 1 includes a central planetary gear 2 driven by an input shaft (not represented) movable in rotation about an axis X (perpendicular to the plane of the figure) as well as an outer ring gear 3 coaxial with the planetary gear 2. The reduction gear 1 further includes planet gears 4 which are meshed with both the planetary gear 2 and the outer ring gear 3. The planet gears 4 are rotatably mounted on pivots 5 of a part called planet gear carrier 7 of the reduction gear 1.

As indicated above, two reduction gear configurations can be envisaged:
- the planetary reduction gears in which the planet gear carrier 7 is fixed and the ring gear 3 is freely rotatable;
- the epicyclic reduction gears in which the ring gear 3 is fixed and the planet gear carrier 7 is freely rotatable.

In a known way, the teeth of the planetary gear 2, of the ring gear 3 and of the planet gears 4 are lubricated with cold lubricating oil, which is conveyed by oil distribution channels (not represented) from an oil tank (not represented).

The operation of the turbojet engines with high bypass ratios requires a particularly high oil flow rate to ensure the lubrication and the cooling of the gears and of the bearings and thus ensure the proper operation of the reduction gear and the safety of the turbojet engine.

However, the ventilation of the gears causes a heating of the cold oil due to the resistive torque phenomenon applied to the reduction gear 1 by the air. The energy generated by this heating is then dissipated by setting the air in motion, which leads to a temperature increase in the reduction gear which can affect the safety of the reduction gear and therefore of the turbojet engine.

It has been found that a large oil recirculation occurs around the groove (not represented) of the planetary gear 2 and causes losses by ventilation of the oil in the reduction gear, which in particular degrades the efficiency of the reduction gear.

There is therefore a need to reduce the ventilation losses and to improve the efficiency of the reduction gear.

DISCLOSURE OF THE INVENTION

To this end, the present invention relates to a lubricating oil deflector for a speed reduction gear of a turbomachine, the deflector comprising a body having a first end intended to be disposed facing a sun gear of the reduction gear, the first end being configured to receive oil from the sun gear and an opposite second end configured to discharge the oil from the body, the body including two side faces each intended to be disposed facing a planet gear of the reduction gear and each connecting the first and second ends together, the body including at least one inner oil guide channel that opens out at the first end and at the second end and is configured to discharge the oil by gravity through the second end.

Thus, when the deflector is arranged such that the first end is at a height located above the height of the second end, under the effect of the Earth's gravity, the configuration of the deflector allows collecting lubricating oil present at the first end and transferring it inside the body, in order to convey it away from the first end and discharge it, at the second remote end, in a direction opposite to the first end.

When the deflector is placed in a speed reduction gear such that the first end is disposed opposite the sun gear of the reduction gear, the oil present at the first end is recovered at least partly by the latter and transferred to the second end where it is discharged, which allows limiting the recirculation of oil around the sun gear and therefore reducing the ventilation losses.

According to other possible features:
- the first end includes a lubricating oil receiving cup intended to receive oil;
- said at least one inner guide channel extending along a longitudinal direction of extension, the lubricating oil receiving cup is positioned at the first end of the body in an offset manner along a transverse direction relative to the longitudinal direction of extension;
- said at least one inner guide channel extending along a longitudinal direction of extension, the first end of the body is provided, in an offset manner along a transverse direction relative to the longitudinal direction of extension, with lubricating oil outlet orifices;
- the body has a generally elongated shape extending from the first end to the second end;
- the generally elongated shape of the body is curved in a portion which is disposed between the first end and the second end and at a distance therefrom;
- the body further includes an inner duct arranged transversely relative to the generally elongated shape of the body.

According to another object, the present invention relates to a speed reduction gear of a turbomachine, characterized in that it comprises at least one lubricating oil deflector as briefly set out above.

This speed reduction gear includes the same features and advantages as the deflector mentioned above.

According to other possible features:
- the reduction gear comprises an architecture of the type comprising a sun gear and planet gears which are disposed around the sun gear and which are engaged, on the one hand, with the sun gear and, on the other hand, with a ring gear which extends around the planet gears;

the planet gears are arranged in a vertical disposition around the sun gear, one or several lubricating oil deflectors as briefly set out above each extending between the sun gear and two adjacent planet gears such that the first end of the gravity deflector(s) is oriented facing the sun gear and is located at a higher vertical position than that of the opposite second end of the concerned deflector which is located at a distance from the sun gear, between the two corresponding adjacent planet gears;

the reduction gear includes a lubricating oil deflector which extends vertically between the sun gear and two adjacent planet gears;

the reduction gear includes at least one lubricating oil deflector which extends obliquely between the sun gear and two adjacent planet gears.

According to yet another object, the present invention relates to a turbomachine comprising a speed reduction gear of a turbomachine as briefly set out above.

BRIEF DESCRIPTION OF THE DRAWINGS

The object of the present disclosure and its advantages will be better understood upon reading the detailed description made below of various exemplary embodiments given as non-limiting examples. This description refers to the pages of the appended figures, on which:

FIG. 1 represents a schematic cross-sectional view of a speed reduction gear according to the prior art;

FIG. 2 represents a simplified and partial schematic view of a speed reduction gear of an aircraft turbojet engine with a fan according to one exemplary embodiment of the invention;

FIG. 3 represents an enlarged schematic view of the speed reduction gear of FIG. 2 showing a deflector according to one exemplary embodiment of the invention;

FIG. 4 represents a schematic cross-sectional view of the deflector of FIG. 3;

FIG. 5 represents a schematic perspective view of the deflector of FIG. 4;

FIG. 6A represents a possible variant of the configuration of a gravity deflector according to the invention;

FIG. 6B represents another possible variant of the configuration of a gravity deflector according to the invention;

FIG. 7 represents a simplified and enlarged schematic view, similar to that of FIG. 2, showing the possible implantation of a deflector according to one exemplary embodiment of the invention.

FIG. 8 represents an axial half-sectional view of one example of a turbomachine integrating the invention;

FIG. 9 represents a possible architecture of a speed reduction gear of the turbomachine of FIG. 8 and likely to incorporate the invention.

DESCRIPTION OF THE EMBODIMENTS

As represented in FIG. 2 and designated by the general reference 10, a speed reduction gear with a planetary architecture of a turbomachine such as a fan aircraft turbojet engine with a high bypass ratio according to one exemplary embodiment of the invention includes a central sun gear 12 driven by an input shaft (not represented) movable in rotation about an axis X (perpendicular to the vertical plane of the figure) and planet gears 14 arranged in a vertical disposition (along the axis Z) around the sun gear 12. The planet gears 14 are engaged, that is to say meshed, with the sun gear 12.

The planet gears 14 are also engaged, that is to say meshed, with an outer ring gear (not represented, but similar to the ring gear 3 of FIG. 1) coaxial with the sun gear 2. These planet gears 14 are rotatably mounted on pivots of a planet gear carrier part of the reduction gear 10 (not represented). FIG. 1 illustrates a possible configuration for the speed reduction gear 10, except for the number of planet gears which may vary.

In the speed reduction gear 10, the planet gear carrier is fixed and the outer ring gear is freely rotatable (planetary reduction gear).

According to the envisaged reduction ratio, the planetary reduction gear can be configured in a single stage or two stages.

In the described exemplary embodiment, although this is by no means limiting, the planetary architecture has, for example, a reduction ratio of about 2 to 6.

In a known manner, the teeth of the sun gear 12, of the outer ring gear and of the planet gears 14 are lubricated with cold lubricating oil conveyed through oil distribution channels (not represented) from an oil tank (not represented).

In the exemplary embodiment illustrated in FIG. 3, the reduction gear 10 includes a lubricating oil deflector 20 (fixed to the planet gear carrier) which extends vertically along the axis Z in a vertical inter-gear space located between the central sun gear 12 and the two adjacent planet gears 14a, 14b located below the sun gear 12. The two adjacent planet gears 14a, 14b are rotatably mounted on pivots of respective axes Pa, Pb of the planet gear carrier part (not represented) and these axes form with the axis of rotation X of the central gear 12 a triangle (illustrated in dotted lines in FIG. 3) whose point is oriented upward and whose base connecting the axes Pa and Pb is horizontal. The gravity deflector 20 is thus positioned at the low part of the reduction gear 10 so as to promote the gravity flow.

The gravity deflector 20 generally comprises a body 22 having opposite first and second ends 24 and 26. According to the implantation of the gravity deflector 20 in the vertical inter-gear space defined above, the first end 24 of the gravity deflector is oriented opposite the sun gear 12 and is located at a higher vertical position (along the axis Z) than that of the opposite second end 26 of the deflector which is located at a distance from the sun gear (along the axis Z), between the two corresponding adjacent planet gears 14a, 14b surrounding it.

FIGS. 4 and 5 represent the deflector 20 without the reduction gear that can integrate it.

The first end 24, oriented upwards, is configured to receive lubricating oil and is here in the form of a lubricating oil receiving cup 24a which collects in particular the oil present in the area located between the sun gear 12 and the first end 24.

The body 22 comprises at least one inner channel (or duct) 28 for guiding or conveying the oil collected by the cup 24a and which extends, along a longitudinal direction of extension (here the direction is coincident with the vertical), from the first end 24, in particular of the cup 24a, to the opposite second end 26. The oil collected by the cup 24a vertically flows in the inner channel 28 under the action of gravity and reaches the opposite second end 26 through which the oil is discharged/ejected from the body by gravity.

In the present exemplary embodiment, only one inner channel 28 is present in the body. However, according to other exemplary embodiments not represented, several channels internal to the body can be envisaged to increase the oil flow rate be discharged, for example by being disposed parallel to each other in the background in FIG. 4

(e.g., double channel). It will be noted that the inner channel 28 can take on different shapes (in particular its passage section) and dimensions depending on the envisaged applications. The inner channel can thus have a rectangular passage section as illustrated in FIG. 5, an oblong, circular passage section, etc.

FIG. 5 shows in perspective a possible example of shape of a lubricating oil receiving cup 24a where the cup has curved (concave) walls oriented downwards, substantially forming a V, which open out at the low part onto an elongated slot 24b (for example of substantially rectangular shape) forming an inlet opening for the inner channel 28.

As represented in FIGS. 3 to 5, the body 22 has a generally elongated shape extending from the first end 24 to the second end 26 and which is curved in a portion disposed between the first end and the second end and at a distance therefrom. The curved portion is here the central portion 22a of the body according to the cross-sectional view of FIGS. 3 and 4.

According to this curved configuration, the two opposite ends 24 and 26 each have a generally flared shape away from the central portion 22a of the body. The general diabolo shape of the body is thus adapted to the general shape of the vertical inter-gear space defined above and illustrated in FIG. 3.

The second end 26 of the body takes the form of a substantially planar face 26a which is horizontally disposed when the deflector 20 is in the position of FIG. 3. An outlet opening 26b of the inner channel 28a opens out at the planar end face 26a to discharge the oil which flows by gravity into the channel.

In the exemplary embodiment illustrated in FIG. 5, the body has a thickness (dimension perpendicular to the plane of FIG. 4) that is here constant and a generally rectangular shape according to a view taken in the direction of the lateral arrow indicated in this figure. The inner channel 28 here extends along a large part of the thickness of the body.

As represented in FIGS. 3 to 5, the lubricating oil receiving cup 24a is positioned at the first end of the body in an offset manner along a transverse direction relative to the longitudinal direction of extension of the inner channel 28. Given the vertical orientation of the longitudinal direction of extension, the cup 24a is thus laterally offset, that is to say horizontally towards one of the two opposite lateral sides of the first end 24. Moreover, the inner channel 28 is also laterally offset towards the corresponding side of the body. This laterally offset disposition of the cup 24a can for example allow promoting the recovery of oil coming from an area located between the sun gear 12 and the planet gear 14b and towards which the cup is laterally offset.

Furthermore, in the illustrated configuration, the first end 24 of the body is provided, in a transversely offset manner relative to the longitudinal direction of extension of the channel, with lubricating oil outlet orifices O2 (jets for lubricating the sun gear-planet gear meshes). In FIG. 5, two outlet orifices O2 are represented, aligned along the thickness of the body 22 but a different number can be alternatively envisaged (a transverse duct not represented allows conveying oil coming from the cup 24a to the ejection points O2). These orifices allow facilitating the external lubrication of the planet gears and can also contribute to the lubrication of the bearings (outlets for the lubrication of the teeth).

The gravity deflector 20 has mainly two functions: it guides the lubricating oil between the deflector and each of the planet gears 14a, 14b, and it guides the oil by inner pipe by gravity effect from the first end 24 to the second end 26.

More particularly, the gravity deflector 20 aims to capture/accumulate, in the cup 24a forming a retention pocket, part of the oil present in the circumferential groove (not represented) of the sun gear 12. The collected oil is accumulated in this cup where it is slowed down before flowing through the opening 24b via the inner channel 28 under the effect of gravity, thus accelerating the flow of oil. The inner channel 28 opens out at a distance from the sun gear and the oil is thus discharged by gravity by exiting through the opening 26b, in the direction of the outer ring gear surrounding the arrangement of FIG. 2, such as the ring gear 3 of FIG. 1.

In other words, the gravity deflector 20 acts as a gravity-effect accumulator that ensures the internal transfer of part of the oil present in the circumferential groove of the sun gear 12 to discharge it from this area and towards the outer ring gear.

This has the effect of reducing the amount of oil recirculated around the sun gear 12 and reducing the losses by ventilation of the oil, thus improving the efficiency of the reduction gear.

It should be noted that the gravity deflector 20 can be manufactured in different ways, for example by cutting into the mass of a block, by additive manufacturing, by casting, or the like.

Other configurations of the gravity deflector can of course be envisaged within the meaning of the present invention in order to ensure the functions mentioned above. The presence of the orifices O2 (lubrication jets) is not essential, nor is the offset position of the cup 24a and of the inner channel, and the shape of the body can vary within the acceptable limits in order to be positioned in the inter-gear space. Its longitudinal dimension can in particular vary to extend to a position closer to the ring gear than what is represented in FIG. 3.

By way of example, FIGS. 6A and 6B illustrate two possible configurations of deflectors 20a and 20b according to which, respectively, the cup 24a' has, in cross-section, a generally conical shape and the cup 24a" has, in cross-section, a generally rectangular shape. The other features of the deflector can be identical to the deflector 20 described above.

FIG. 7 illustrates another exemplary embodiment of a speed reduction gear 10' in which one or several gravity deflectors 20', 20", 20''' can be implanted in an inter-gear space. Only two adjacent planet gears 14' of the lower portion of the reduction gear and the sun gear 12' are represented in solid lines (two other planet gears adjacent to the two first ones are partially represented schematically in dotted lines) but the configuration is generally the same as the one in FIG. 2.

Thus, in general, a gravity deflector 20", 20''' can be positioned between the sun gear 12' and two adjacent planet gears 14' such that the first end of the gravity deflector is oriented facing the sun gear 12' and is located at a higher vertical position than that of the opposite second end of the concerned deflector. The opposite second end of the concerned deflector is located at a distance from the sun gear 12', between the two corresponding planet gears 14'. In this exemplary embodiment, a gravity deflector 20", 20''' thus extends obliquely, relative to the vertical Z, between the sun gear 12' and the two adjacent planet gears 14' in solid lines. The angle of inclination between the concerned gravity deflector and the vertical passing through the gravity deflector 20' depends in particular on the number of the planet gears 14'. The higher this number, the smaller the angle of inclination. The configuration of the lateral gravity deflectors 20", 20''' is generally different from that of the gravity deflector 20' although the general outer shape can be identical. Particularly, the slope of the inner channel 28" and 28''' for guiding the oil flow for the deflectors 20" and 20''' (discharge slope) can be modified relative to the configuration of the inner channel 28 of FIG. 4 (this channel 28 is aligned with the general longitudinal direction of the deflector 20), in order to promote the flow of oil towards the bottom of the reduction gear. Thus, each inner guide channel 28" and 28''' is inclined downward relative to the general longitudinal direction of the considered deflector, schematized by the dotted line D1, D2 in FIG. 7. Similarly, the receiving cup (not represented here) can also be modified relative to that of FIG. 4, for example, as in FIGS. 6A and 6B, or in another manner.

By way of example, the reduction gear 10' can also comprise the deflector 20' identical to the deflector 20 of FIGS. 2 to 5.

According to one variant not represented, the reduction gear 10' can comprise the deflector 20' identical to the deflector 20 of FIGS. 2 to 5 and one of the deflectors 20", 20''' or all three deflectors 20', 20" and 20'''. Alternatively, the reduction gear 10' can comprise only either of the deflectors 20", 20''', without the deflector 20'.

FIG. 8 illustrates a possible example of a turbomachine (along an axial half-section relative to the longitudinal axis X of the turbomachine) that can integrate the invention. The turbomachine 30, which is here an aircraft turbojet engine with a fan, conventionally includes a fan S, a low-pressure compressor 30a, a high-pressure compressor 30b, an annular combustion chamber 30c, a high-pressure turbine 30d, a low-pressure turbine 30e and an exhaust nozzle 30f. The high-pressure compressor 30b and the high-pressure turbine 30d are connected by a high-pressure shaft 32 and form a high-pressure (HP) body therewith. The low-pressure compressor 30a and the low-pressure turbine 30e are connected by a low-pressure shaft 33 and form a low-pressure (LP) body therewith.

The fan S is driven by a fan shaft 34 which is driven by the LP shaft 33 by means of a speed reduction gear 36. This reduction gear is here of the planetary type and is positioned in the front portion of the turbomachine. A fixed structure, including schematically here an upstream portion 35a and a downstream portion 35b which makes up the engine casing or stator 35, is arranged so as to form an enclosure E surrounding the reduction gear 36. This enclosure E is here closed upstream by seals at the level of a bearing allowing the passage of the fan shaft 34 and downstream by seals at the level of the passage of the LP shaft 33.

Other configurations of turbomachines can of course be envisaged to implement the invention.

FIG. 9 illustrates a possible example of a configuration (along an axial half-section) for the reduction gear 36 of FIG. 8. At the inlet, the reduction gear 36 is connected to the LP shaft 33, for example via splines 37a. Thus the LP shaft 33 drives a sun gear 37. Conventionally, the sun gear 37, whose axis of rotation is coincident with that of the turbomachine X, drives a series of planet gears 38, which are equally distributed on the same diameter about the axis of rotation X. This diameter is equal to twice the operating center distance between sun 37 and planet gears 38. The number of planet gears 38 is generally defined between three and seven for this type of application.

The set of planet gears 38 is held, at the outlet, by a frame called planet gear carrier 40. Each planet gear 38 rotates about its own axis Y and meshes with the outer ring gear 39.

In this planetary configuration, the planet gear carrier 40 is fixed to the engine casing or stator 35 of FIG. 8. Each planet gear 38 drives the ring gear 39 which is added to the fan shaft 34 (FIG. 8) via a ring gear carrier 42.

Each planet gear 38 is freely mounted in rotation by means of a bearing 41, for example of the hydrostatic rolling bearing or bearing. Each bearing 41 is mounted on one of the axes 40b of the planet gear carrier 40, and all axes are positioned relative to each other by means of one or several structural frames 40a of the planet gear carrier 40. There is a number of axes and bearings equal to the number of planet gears. For operational, mounting, manufacturing, inspection, repair or replacement purposes, the axes and the frame can be separated into several parts.

The teeth of a reduction gear can be for example separated into several propellers. In the example illustrated, the operation of a multi-propeller reduction gear with a ring gear separated into two half ring gears will be described below.

A front half ring gear 39a consists of a rim 39aa and of a fixing half-flange 39ab. The front propeller of the teeth of the reduction gear is on the rim 39aa. This front propeller meshes with that of the planet gear 38 which meshes with that of the sun gear 37.

A rear half ring gear 39b consists of a rim 39ba and of a fixing half-flange 39bb. The rear propeller of the teeth of the reduction gear is on the rim 39ba. This rear propeller meshes with that of the planet gear 38 which meshes with that of the sun gear 37.

The fixing half-flange 39ab of the front ring gear 39a and the fixing half-flange 39bb of the rear ring gear 39b form the fixing flange 39c of the ring gear. The ring gear 39 is fixed to a ring gear carrier by assembling the fixing flange 39c of the ring gear and the fixing flange 42a of the ring gear carrier using a bolt mounting for example.

The arrows of FIG. 9 describe the conveying of the oil in the reduction gear 36. The oil reaches the reduction gear 36 from the stator portion 35 (FIG. 8) in the distributor 43 by various means which will not be specified in this view because they are specific to one or several types of architecture. The distributor is separated into two portions in general, each repeated by the same number of planet gears. The injectors 43a have the function of lubricating the teeth and the arms 43b have the function of lubricating the bearings. The oil is supplied to the injector 43a and exits through the end 43c in order to lubricate the teeth. The oil is also supplied to the arm 43b and circulates via the supply outlet 43d of the bearing. The oil then circulates through the axis into one or several buffer area(s) 40c and then exits through the orifices 40d in order to lubricate the bearings of the planet gears.

Although the present invention has been described with reference to specific embodiments, it is obvious that modifications and changes can be made to these examples without departing from the general scope of the invention as defined by the claims. Particularly, individual characteristics of the various illustrated/mentioned embodiments can be combined in additional embodiments. Accordingly, the description and drawings should be considered in an illustrative rather than a restrictive sense.

The invention claimed is:

1. A lubricating oil deflector for a speed reduction gear of a turbomachine, the deflector comprising a body having a first end face comprising a first end configured to be disposed facing a sun gear of the reduction gear, the first end being configured to receive oil from the sun gear, the body having an opposite end face comprising an opposite second end configured to discharge the oil from the body, the body including two side faces each configured to be disposed facing a planet gear of the reduction gear and each connecting the first and second faces together, the body extending along a longitudinal direction from the first end face to the second end face, the body including at least one inner oil guide channel that extends along the longitudinal direction, opens out at the first end face of the first end and at the second end face of the second end and is configured to discharge the oil by gravity through the second end.

2. The lubricating oil deflector according to claim 1, wherein in that the first end includes a lubricating oil receiving cup intended to receive oil.

3. The lubricating oil deflector according to claim 2, wherein said at least one inner oil guide channel extending along a longitudinal direction of extension, the lubricating oil receiving cup is positioned at the first end of the body in an offset manner along a transverse direction relative to the longitudinal direction of extension.

4. The lubricating oil deflector according to claim 2, wherein said at least one inner oil guide channel extending along a longitudinal direction of extension, the first end of the body is provided, in an offset manner along a transverse direction relative to the longitudinal direction of extension, with lubricating oil outlet orifices.

5. The lubricating oil deflector according to claim 1, wherein the body has a generally elongated shape extending from the first end to the second end.

6. The lubricating oil deflector according to claim 5, wherein the generally elongated shape of the body is curved in a portion which is disposed between the first end and the second end and spaced therefrom.

7. A speed reduction gear of a turbomachine, wherein it comprises at least one lubricating oil deflector according to claim 1.

8. The speed reduction gear of a turbomachine according to claim 7, wherein it comprises the sun gear and the planet gears which are disposed around the sun gear and which are engaged, on the one hand, with the sun gear and, on the other hand, with a ring gear which extends around the planet gears.

9. The speed reduction gear of a turbomachine according to claim 8, wherein the planet gears are arranged in a vertical disposition around the sun gear, one or several lubricating oil deflectors each extending between the sun gear and two adjacent planet gears such that the first end of the deflector (s) is oriented facing the sun gear and is located at a higher vertical position than that of the opposite second end of the concerned deflector which is located at a distance from the sun gear, between the two corresponding circumferentially adjacent planet gears.

10. The speed reduction gear of a turbomachine according to claim 9, wherein it includes the lubricating oil deflector which extends vertically between the sun gear and two circumferentially adjacent planet gears.

11. The speed reduction gear of a turbomachine according to claim 8, wherein it includes at least one lubricating oil deflector which extends obliquely between the sun gear and two adjacent planet gears.

12. A turbomachine, wherein it comprises a speed reduction gear of a turbomachine according to claim 7.

13. The lubricating oil deflector according to claim 1, wherein the first end is in the form of a lubricating oil-receiving cup.

* * * * *